United States Patent
Park et al.

(10) Patent No.: US 9,207,496 B2
(45) Date of Patent: Dec. 8, 2015

(54) MANUFACTURING METHOD OF DISPLAY PANEL

(75) Inventors: Eun-Kil Park, Cheonan-si (KR); Hyun-Ho Kang, Ansan-si (KR); Yong Woo Hyung, Yongin-si (KR)

(73) Assignee: Samsung Display Co., Ltd. (KR)

( * ) Notice: Subject to any disclaimer, the term of this patent is extended or adjusted under 35 U.S.C. 154(b) by 309 days.

(21) Appl. No.: 13/490,368

(22) Filed: Jun. 6, 2012

(65) Prior Publication Data

US 2013/0143463 A1    Jun. 6, 2013

(30) Foreign Application Priority Data

Dec. 6, 2011    (KR) .................... 10-2011-0129633

(51) Int. Cl.
*G02F 1/1345* (2006.01)
*G02F 1/1337* (2006.01)
*G02F 1/1362* (2006.01)

(52) U.S. Cl.
CPC ........ *G02F 1/133753* (2013.01); *G02F 1/1345* (2013.01); *G02F 1/1362* (2013.01)

(58) Field of Classification Search
CPC ..... G02F 1/1303; G02F 1/1309; G02F 1/133; G02F 1/1345; G02F 1/13452
USPC .............................. 349/149, 152, 151; 445/24
See application file for complete search history.

(56) References Cited

U.S. PATENT DOCUMENTS

| | | | |
|---|---|---|---|
| 7,821,602 B2 | 10/2010 | Mizuki et al. | |
| 7,847,872 B2 | 12/2010 | Kim | |
| 2006/0186913 A1* | 8/2006 | Kim | 324/770 |
| 2009/0213320 A1 | 8/2009 | Son et al. | |
| 2009/0270007 A1 | 10/2009 | Seok et al. | |
| 2010/0007830 A1 | 1/2010 | Kim et al. | |
| 2010/0007841 A1* | 1/2010 | Baek et al. | 349/152 |
| 2010/0045886 A1 | 2/2010 | Kwak | |
| 2010/0118223 A1 | 5/2010 | Ishizaki | |
| 2010/0208183 A1 | 8/2010 | Kim | |
| 2011/0141417 A1 | 6/2011 | Kim | |

FOREIGN PATENT DOCUMENTS

| | | |
|---|---|---|
| KR | 1020050068148 A | 7/2005 |
| KR | 1020090090817 A | 8/2009 |
| KR | 1020100025317 A | 3/2010 |
| KR | 1020100129023 A | 12/2010 |

* cited by examiner

*Primary Examiner* — Karabi Guharay

(74) *Attorney, Agent, or Firm* — Innovation Counsel LLP

(57) ABSTRACT

A manufacturing method for a display panel includes: forming a first display panel including a plurality of pixel electrodes, gate lines and data lines connected to the pixel electrodes, a first pad unit connected to the gate lines, and a second pad unit connected to the data lines; forming a second display panel including a common electrode; forming a first short point connected to the first pad unit; forming a second short point connected to the second pad unit; adhering the first display panel and the second display panel; dividing the second display panel into a plurality of regions insulated from each other, a first region corresponding to the first short point, a second region corresponding to the second short point, and a third region; and applying a first voltage to the first region, a second voltage to the second region, and a third voltage to the third region.

25 Claims, 14 Drawing Sheets

FIG.10
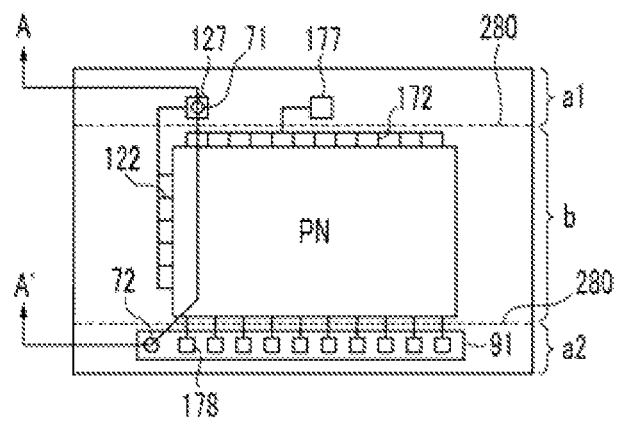
(a)
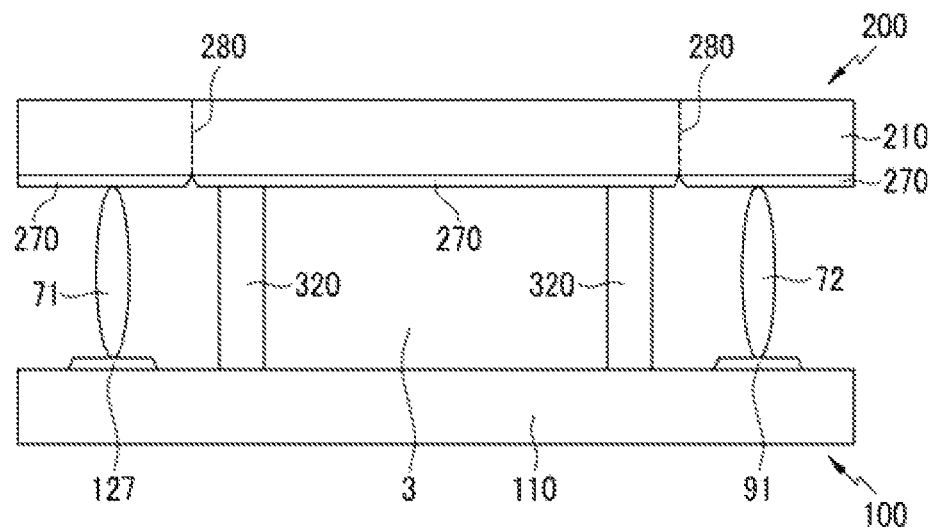
(b)

FIG.11
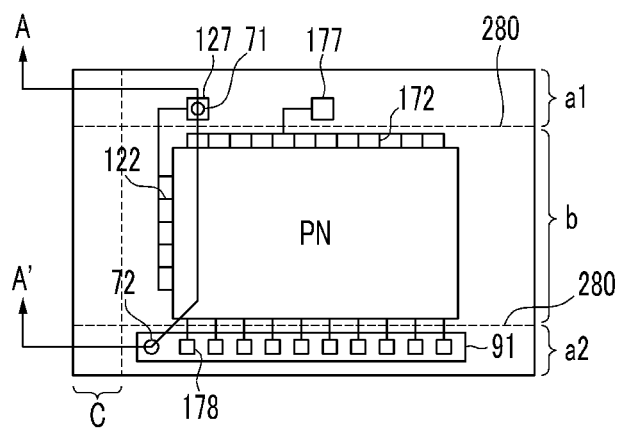
(a)
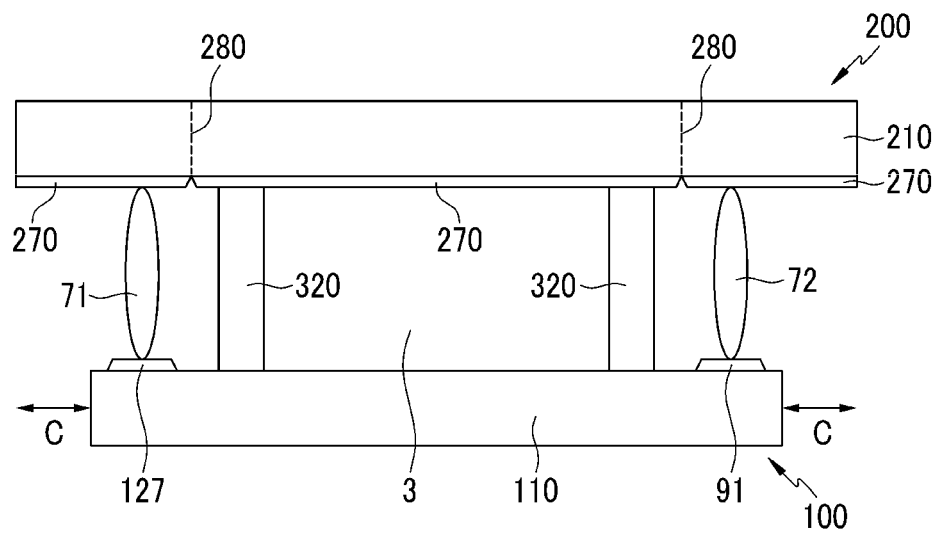
(b)

FIG.12
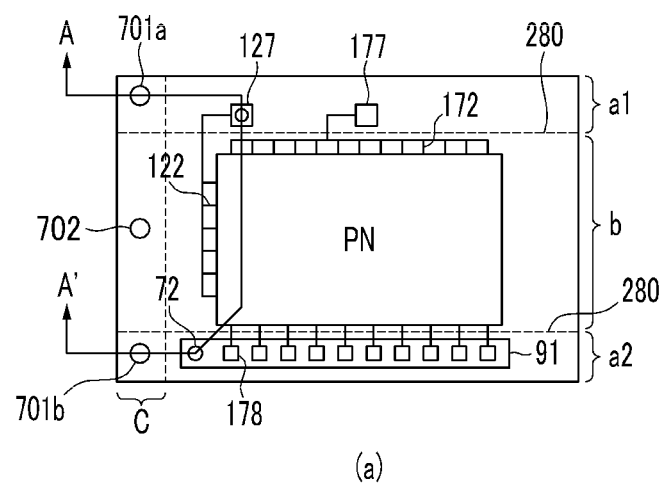
(a)
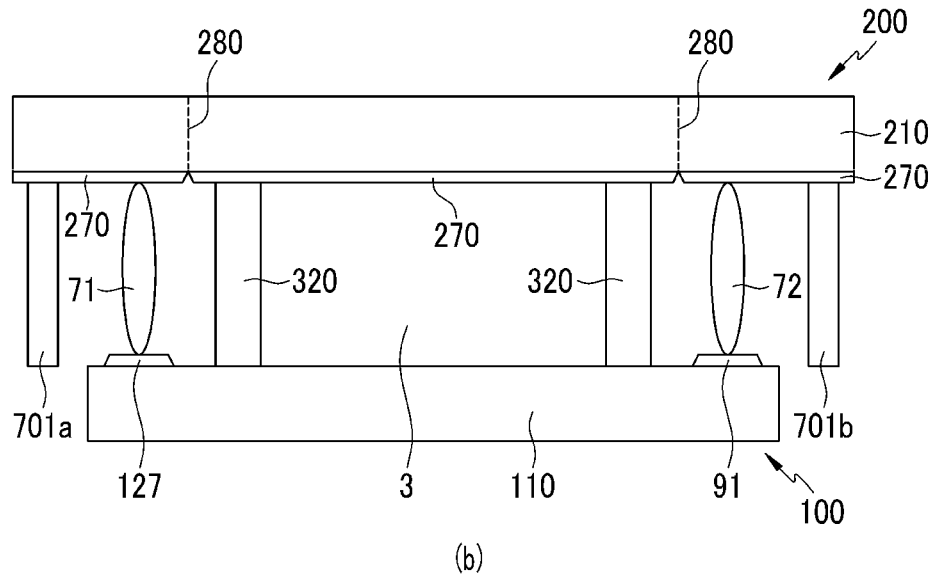
(b)

MANUFACTURING METHOD OF DISPLAY PANEL

CROSS-REFERENCE TO RELATED APPLICATION

This application claims priority to and the benefit of Korean Patent Application No. 10-2011-0129633 filed in the Korean Intellectual Property Office on Dec. 6, 2011, the entire contents of which are incorporated herein by reference.

BACKGROUND OF THE INVENTION (a) Field of the Invention

The present invention relates to a manufacturing method for a display panel. Particularly, the present invention relates to a manufacturing method for a display panel for a liquid crystal display.

(b) Description of the Related Art

Liquid crystal displays (LCD) are one of the most commonly used flat panel displays. LCDs include two substrates with electrodes formed thereon and a liquid crystal layer interposed between the two substrates. In the LCD, a voltage is applied to the electrodes to realign liquid crystal molecules of the liquid crystal layer to thereby regulate the transmittance of light passing through the liquid crystal layer.

To increase the response speed of the liquid crystal display, various methods have been proposed for initially aligning the liquid crystal molecules. The initial alignment provides a pretilt to the liquid crystal molecules that increases response speed. In one such initial alignment method used to provide pretilt to the liquid crystal molecules, a prepolymer is used that is polymerized by light such as ultraviolet rays. In the method, each field generating electrode is applied with a voltage having a desired magnitude before exposing the prepolymer to the ultraviolet rays.

In a manufacturing method for liquid crystal displays, a thin film pattern of a multi-layered structure is formed on a mother glass. The thin film pattern includes a plurality of cells and is formed through a deposition process and a photolithography process. The mother glass is then divided into the plurality of cells to complete the display device.

In such a manufacturing method for liquid crystal displays, when performing the initial alignment method described above, if the voltage for is applied and exposure to the ultraviolet light is performed after the a cells of the mother substrate are divided, much time and equipment is required, thereby decreasing productivity.

Furthermore, in the initial alignment method, the photoalignment is performed by applying voltages of the same magnitude to the gate line and the data line of the lower panel. However, the gate voltage and the data voltage used to actually drive the liquid crystal layer when the display is in use are different. As a result, the initial alignment of the liquid crystal molecules of the liquid crystal layer may be not correct, thereby causing defects such as light leakage.

The above information disclosed in this Background section is only for enhancement of understanding of the background of the invention and therefore it may contain information that does not form the prior art that is already known in this country to a person of ordinary skill in the art.

SUMMARY OF THE INVENTION

A manufacturing method of a display panel is provided that reduces manufacturing cost by, in an initial alignment step, applying a voltage to a mother panel glass unit including a plurality of cells of a liquid crystal display so that the voltage is applied to the plurality of cells simultaneously, without having to apply the voltage to each cell individually, and applying different voltages to a gate line and a data line of each cell.

A manufacturing method of a display panel includes: forming a first display panel, the first display panel including a plurality of pixel electrodes, a plurality of gate lines connected to the plurality of pixel electrodes, a first pad unit connected to the plurality of gate lines, a plurality of data lines connected to the plurality of pixel electrodes, and a second pad unit connected to the plurality of data lines; forming a second display panel including a common electrode; forming a first short point connected to the first pad unit; forming a second short point connected to the second pad unit; aligning and adhering the first display panel and the second display panel; and dividing the second display panel into a plurality of regions insulated from each other, a first region positioned to correspond to the first short point, a second region positioned to correspond to the second short point, and a third region; and applying a first voltage to the first region, a second voltage to the second region, and a third voltage to the third region.

At least one of the first pad unit and the second pad unit may be a driving pad.

At least one of the first short point and the second short point may be formed on the driving pad.

A first interval between the first pad unit and the plurality of pixel electrodes may be different from a second interval between the second pad unit and the plurality of pixel electrodes.

A first interval between the first pad unit and the plurality of pixel electrodes and the interval between the second pad unit and the plurality of pixel electrodes may be formed to be the same, and the method further including forming a connecting member connected to one of the first pad unit and the second pad unit.

One of the first pad unit and the second pad unit may be a test pad.

The method may further include connecting the test pad through a connecting member, and the second short point may be formed on the connecting member.

The first short point and the second short point may electrically connect the first display panel and the second display paneled to each other and may be formed in the first display panel or the second display panel.

The dividing of the second display panel into the plurality of regions insulated from each other may divide the common electrode into a plurality of electrodes insulated from each other.

The dividing of the second display panel into the plurality of regions insulated from each other may include using a laser.

The first voltage applied to the first region may be transmitted to the first short point through the common electrode of the second display panel and may be transmitted to the gate line through the first short point.

The second voltage applied to the second region may be transmitted to the second short point through the common electrode of the second display panel and may be transmitted to the data line through the second short point.

The third voltage applied to the third region may be only transmitted to the common electrode of the second display panel.

According to the manufacturing method of the display panel, the first short point is formed at the gate driving pad, the gate line is applied with the first voltage through the first short point, the second short point is formed at the test pad or the data driving pad, the data line is formed with the second voltage through the second short point, and the upper panel is trimmed to divide it into the region formed with the first short point, the region formed with the second short point, and the region of the common voltage application of the upper panel, and thereby the voltage of the desired magnitude may be applied to the gate line and the data line of the lower panel. Accordingly, the manufacturing cost may be reduced by applying the voltage as the unit of the mother panel glass including a plurality of cells of the liquid crystal display, and additionally, the gate line of the data line of each cell may be applied with the different voltages, thereby increasing the accuracy of the initial alignment.

BRIEF DESCRIPTION OF THE DRAWINGS

FIG. 8 to FIG. 13 are views sequentially showing a manufacturing method of a display panel according to an exemplary embodiment.

DETAILED DESCRIPTION OF THE EMBODIMENTS

Figure 1:
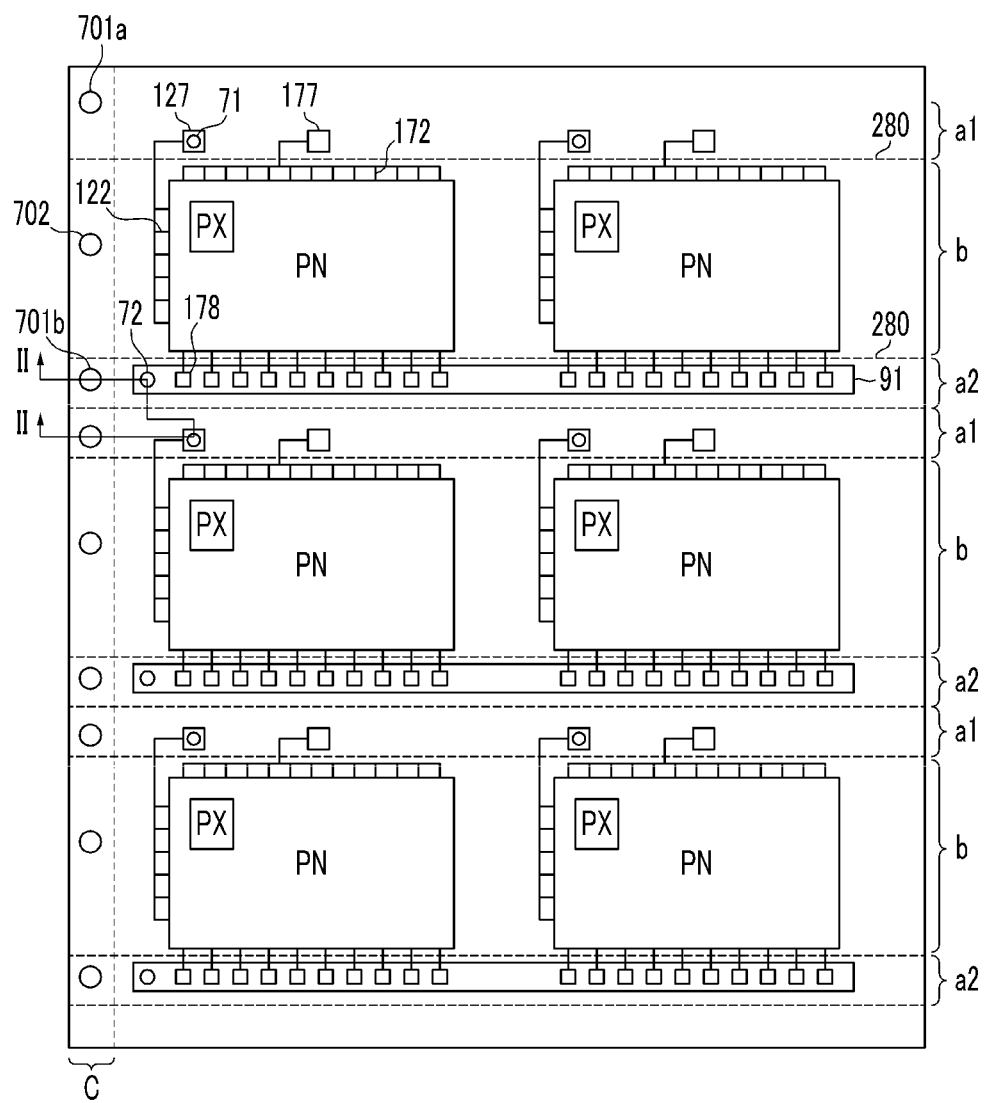
FIG. 1 is a top plan view of a manufacturing method of a display panel according to an exemplary embodiment.

The embodiments will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Now, a display panel according to an exemplary embodiment will be described with reference to accompanying drawings.

Figure 2:
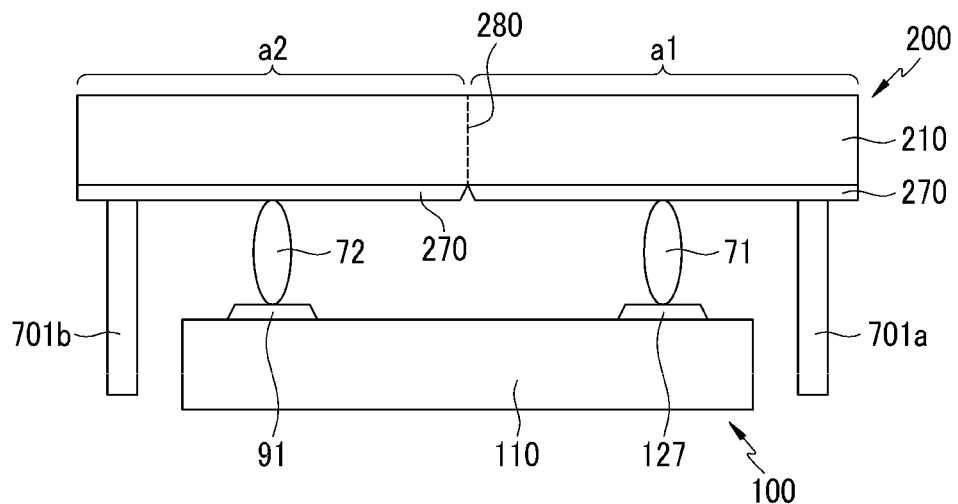
FIG. 2 is a cross-sectional view taken along the line II-II of FIG. 1.

FIG. 1 is a top plan view of a manufacturing method of a display panel according to an exemplary embodiment, and FIG. 2 is a cross-sectional view taken along the line II-II of FIG. 1.

Referring to FIG. 1 and FIG. 2, in a manufacturing method for display panel according to an exemplary embodiment, the display panel is a mother panel that simultaneously includes several liquid crystal panels PN each to be used for a liquid crystal display device. For example, as shown in FIG. 1, the display panel includes six regions of the liquid crystal panels PN. Each liquid crystal panel PN includes a plurality of pixels PX. As shown in FIG. 2, the display panel includes two combined mother panel substrates.

As shown in FIG. 1 and FIG. 2, the display panel includes a thin film transistor array panel 100 formed with a plurality of thin films (not shown), and a common electrode panel 200. The thin film transistor array panel 100 includes a first insulation substrate 110 and a plurality of thin films (not shown) formed on the first insulation substrate 110. The common electrode panel 200 includes a second insulation substrate 210 and a common electrode 270 formed on the second insulation substrate 210. The thin film transistor array panel 100 and the common electrode panel 200 will be described in detail below. A plurality of voltage application units 701a, 701b, and 702 are formed at an edge of the display panel. The voltage application units 701a, 701b, and 702 are contacted with a pin or a probe (not shown) for application of a voltage to the voltage application units and the display panel.

Each liquid crystal panel PN includes a plurality of gate driving signal lines 122 each connected to a gate line (not shown) and a plurality of data driving signal lines 172 each connected to a data line (not shown). Each pixel is connected to a gate line (not shown) and a data line (not shown). The gate driving signal lines 122 are all connected to a gate driving pad 127, and the data driving signal lines 172 are all connected to a data driving pad 177. Each data line is connected to each data test pad 178. Although not shown, a gate test pad connected to each gate line may be further included. The plurality of data test pads 178 are connected to each other through a first connecting member 91. Although not shown, at least one insulating layer is disposed between the first connecting member 91 and the data test pad 178. The insulating layer has a contact hole exposing a portion of the data test pad 178, and the first connecting member 91 is formed to cover the test pad 178 exposed through the contact hole, and thereby the data test pad 178 and the first connecting member 91 are connected to each other. The first connecting member 91 may connect all test pads 178 of a plurality of liquid crystal panels PN.

The display panel is divided into a plurality of regions, including a first region a1, a second region a2, and a third region b, by a plurality of region division lines 280. The region division lines 280 may be formed, for example, by a laser. The region division lines 280 are formed at the common electrode panel 200, and the common electrode 270 formed on the common electrode panel 200 is electrically insulated for the regions a1, a2, and b, so that the common electrode in each of the three regions a1, a2, and b is electrically isolated from the common electrode in any of the other regions a1, a2, and b.

The voltage application units 701a, 701b, and 702 may be formed at the common electrode panel 200. The portion of the edge of the thin film transistor array panel 100 that corresponds to the position of the region wherein a plurality of voltage application units 701a, 701b, and 702 are positioned is removed, such that the common electrode panel 200 in the region that is formed with the voltage application units 701a, 701b, and 702 is exposed.

In the exemplary embodiment illustrated in FIGS. 1 and 2, a first short point 71 is formed on the gate driving pad 127, and a second short point 72 is formed on the first connecting member 91. Via the first short point 71, the thin film transistor array panel 100 and the common electrode panel 200 are electrically connected to each other in the first region a1. Via the second short point 72, the thin film transistor array panel 100 and the common electrode panel 200 are electrically connected in the second region a2. The short points 71 and 72 may be formed on one of the thin film transistor array panel 100 and the common electrode panel 200.

When a first voltage is applied to the first voltage application unit 701a formed in the first region a1, the applied first voltage passes through the common electrode 270 of the common electrode panel 200 and through the first short point 71, is applied to the gate driving pad 127 of the thin film transistor array panel 100, and is transmitted to the gate driving signal line 122 and the gate lines. When a second voltage is applied to the second voltage application unit 701b formed at the second region a2, the applied second voltage passes through the common electrode 270 of the common electrode panel 200 and through the second short point 72, is transmitted to the first connecting member 91 of the thin film transistor array panel 100, and is applied to the data lines through the data test pad 178.

Also, if a third voltage is applied to the third voltage application unit 702 formed in the third region b, the applied third voltage is only applied to the common electrode 270 of the common electrode panel 200. The third region b is a region corresponding to a plurality of pixel electrodes PX of the liquid crystal panel PN.

As described above, the common electrode panel 200 is divided into a plurality of regions a1, a2, and b that are electrically insulated by the region division lines 280 such that voltage applied to the voltage application units 701a, 701b, and 702 is applied to the regions a1, a2, and b that are insulated from each other.

As described above, according to the manufacturing method of the display panel according to an exemplary embodiment, the gate line and the data line formed in the thin film transistor array panel of a plurality of panels and the common electrode formed in the common electrode panel may be applied with a voltage of a desired magnitude. Furthermore, in the initial photoalignment process, voltage is applied to a unit of the mother panel glass including a plurality of cells of the liquid crystal display such that the manufacturing cost is simultaneously reduced, and a different voltage may be applied to the gate line and the data line of each cell such that the accuracy of the initial alignment may be increased.

Figure 3:
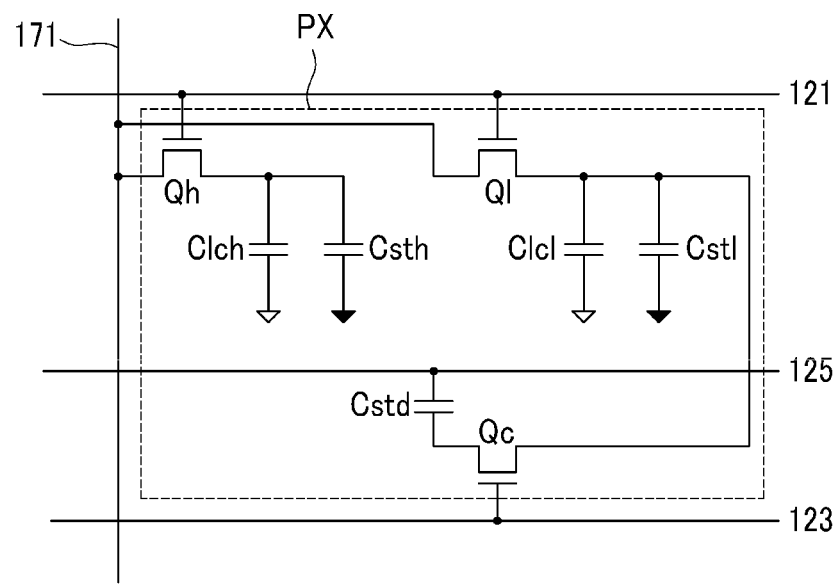
FIG. 3 is an equivalent circuit diagram of one pixel of a liquid crystal panel according to an exemplary embodiment.
Figure 4:
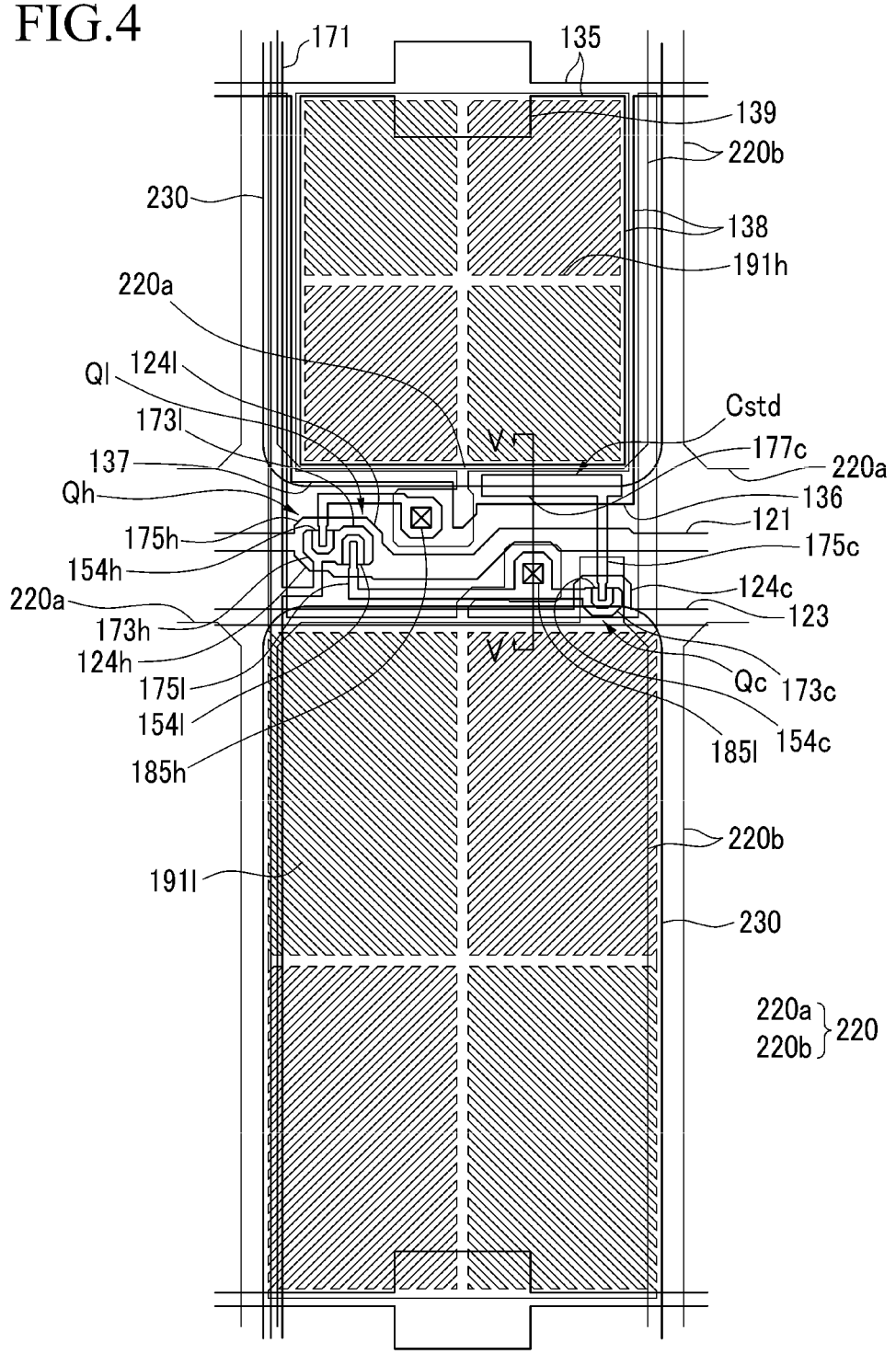
FIG. 4 is a layout view of one pixel of a liquid crystal panel according to an exemplary embodiment.
Figure 5:
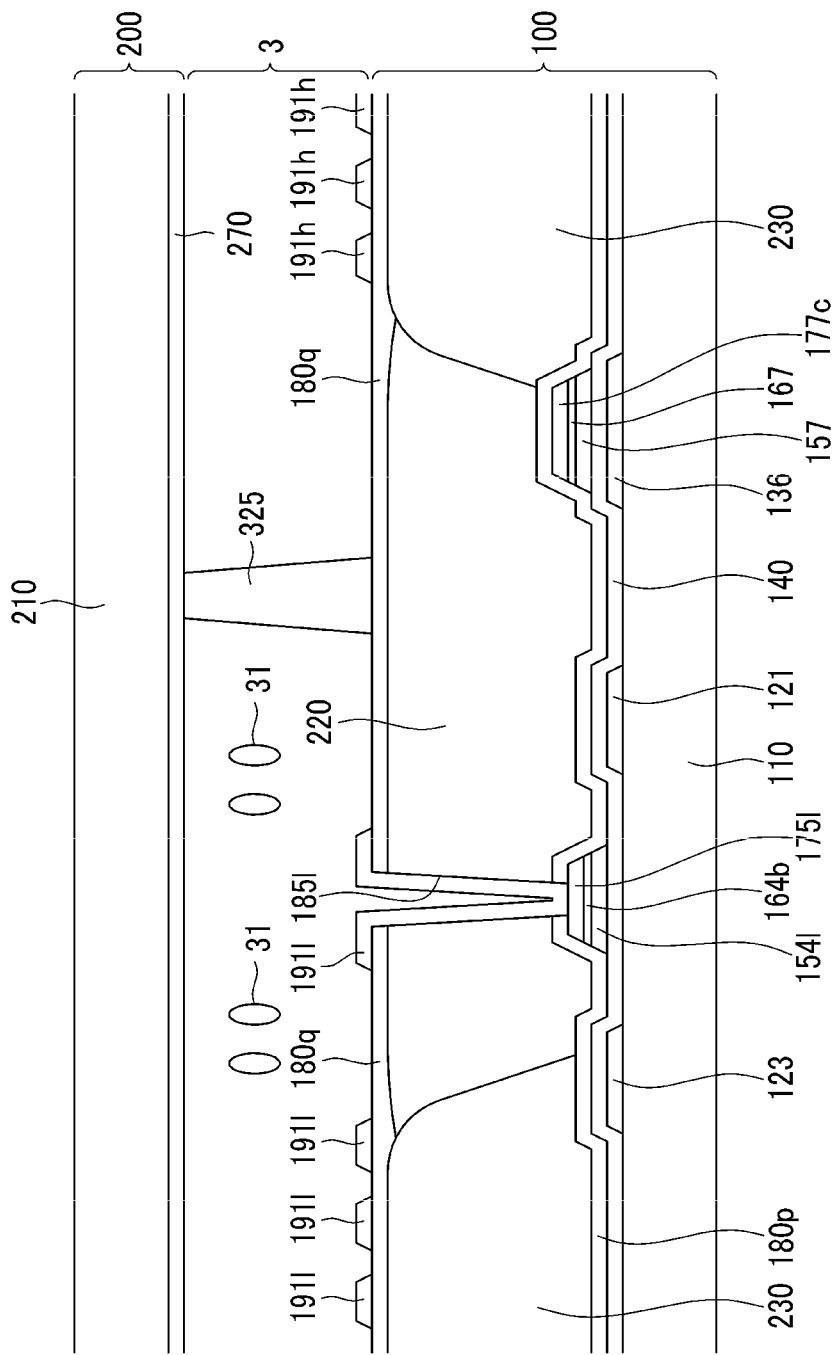
FIG. 5 is a cross-sectional view taken along the line V-V of FIG. 4.
Figure 6:
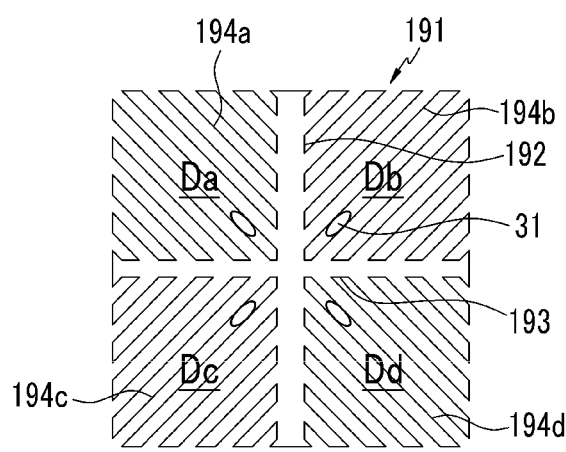
FIG. 6 is a view of a basic structure of the pixel of FIG. 4.

An example of an individual pixel PX of the liquid crystal panel PN according to an exemplary embodiment will be described with reference to FIGS. 3 to 6. FIG. 3 is an equivalent circuit diagram of one pixel of a liquid crystal panel according to an exemplary embodiment, FIG. 4 is a layout view of one pixel of a liquid crystal panel according to an exemplary embodiment, FIG. 5 is a cross-sectional view taken along the line V-V of FIG. 4, and FIG. 6 is a view of a basic structure of the pixel of FIG. 4.

Referring to FIG. 3, the liquid crystal display according to an exemplary embodiment includes signal lines including a gate line 121, a storage electrode line 125, a step-down gate line 123, and a data line 171, and a pixel PX connected thereto.

The pixel PX includes first to third switching elements Qh, Ql, and Qc, first and second liquid crystal capacitors Clch and Clcl, first and second storage capacitors Csth and Cstl, and a step-down capacitor Cstd. Here, the first switching element Qh and the first thin film transistor Qh, the second switching element Ql and the second thin film transistor Ql, and the third switching element Qc and the third thin film transistor Qc are denoted by the same reference numerals.

The first and second thin film transistors Qh and Ql are respectively connected to the gate line 121 and the data line 171, and the third thin film transistor Qc is connected to the step-down gate line 123.

The first and second thin film transistors Qh and Ql, as three terminal elements provided in the lower panel 100, have a control terminal connected to the gate line 121, an input terminal connected to the data line 171, and an output terminal connected to, respectively, the first and second liquid crystal capacitors Clch and Clcl and the first and second storage capacitors Csth and Cstl.

The third thin film transistor Qc, as a three terminal element provided in the lower panel 100, has a control terminal connected to the step-down gate line 123, an input terminal connected to the second liquid crystal capacitor Clcl, and an output terminal connected to the step-down capacitor Cstd.

The first and second liquid crystal capacitors Clch and Clcl are formed by overlapping first and second subpixel electrodes 191h and 191l connected to the first and second switching elements Qh and Ql with the common electrode 270 of the upper panel 200. The first and second storage capacitors Csth and Cstl are formed by overlapping the storage electrode line 125 as well as a storage electrode 139 and first and second subpixel electrodes 191h and 191l.

The step-down capacitor Cstd is connected to the output terminal of the third thin film transistor Qc and the storage electrode line 125. The storage electrode line 125 provided in the lower panel 100 and the output terminal of the third thin film transistor Qc overlap each other via an insulator.

Next, the liquid crystal display shown in FIG. 2 will be described with reference to FIG. 4 to FIG. 6 in detail.

As described above, a liquid crystal display according to the present exemplary embodiment includes a lower panel 100 and an upper panel 200 facing each other, a liquid crystal layer 3 interposed between the two display panels 100 and 200, and a pair of polarizers (not shown) attached at the outer surfaces of the display panels 100 and 200.

Firstly, the thin film transistor array panel 100 will be described.

A plurality of gate conductors including a plurality of gate lines 121, a plurality of step-down gate lines 123, and a plurality of storage electrode lines 125 are formed on an insulation substrate 110.

The gate lines 121 and the step-down gate lines 123 transfer gate signals and mainly extend in a transverse direction. Each gate line 121 includes a first gate electrode 124h and a second gate electrode 124l protruding upward and downward, and each step-down gate line 123 includes a third gate electrode 124c protruding upward. The first gate electrode 124h and the second gate electrode 124l are connected to each other, thereby forming one protrusion.

The storage electrode lines 125 are mainly extended in the transverse direction and transfer a predetermined voltage such as a common voltage Vcom. The storage electrode line 125 includes a storage electrode 139 protruding upward and downward, a pair of longitudinal portions 138 extending downward substantially perpendicularly to the gate line 121, and a transverse portion 137 connecting the ends of a pair of longitudinal portions 138 to each other. The transverse portion 137 includes a capacity electrode 136 extended downward.

A gate insulating layer 140 is formed on the gate conductors 121, 123, and 125.

A plurality of semiconductors, made of, for example, hydrogenated amorphous silicon (a-Si), polysilicon, or so on, are formed on the gate insulating layer 140. The semiconductors include first and second semiconductors 154h and 154l extending toward the first and second gate electrodes 124h and 124l and connected to each other, and a third semiconductor 154c connected to the second semiconductor 154l. The third semiconductor 154c is extended, thereby forming a fourth semiconductor 157.

A plurality of ohmic contacts are formed on the semiconductors, wherein first ohmic contacts (not shown) are formed on the first semiconductor 154h, and a second ohmic contact 164b and a third ohmic contact (not shown) are also formed on the second semiconductor 154l and the third semiconductor 154c. The third ohmic contact is extended, thereby forming a fourth ohmic contact 167.

A data conductor that includes a plurality of data lines 171, a plurality of first drain electrodes 175h, a plurality of second drain electrodes 175l, and a plurality of third drain electrodes 175c is formed on the ohmic contacts 164b and 167.

The data lines 171 transmit data signals and extend in the longitudinal direction thereby intersecting the gate lines 121 and the step-down gate lines 123. Each data line 171 includes a first source electrode 173h and a second source electrode 173l forming a "W" shape together and extending toward the first gate electrode 124h and the second gate electrode 124l.

The first drain electrode 175h, the second drain electrode 175l, and the third drain electrode 175c have one end portion having a wide area and the other end portion having a linear, or bar, shape. The bar-shaped end portions of the first drain electrode 175h and the second drain electrode 175l are partially enclosed by the first source electrode 173h and the second source electrode 173l. The wide end portion of the second drain electrode 175l is again extended thereby forming the third source electrode 173c having a "U" shape. An expansion 177c of the third drain electrode 175c overlaps the capacity electrode 136 thereby forming a step-down capacitor Cstd, and the bar end portion is partially enclosed by the third source electrode 173c.

The first/second/third gate electrode 124h/124l/124c, the first/second/third source electrode 173h/173l/173c, and the first/second/third drain electrode 175h/175l/175c, along with the first/second/third semiconductor island 154h/154l/154c, and a channel of the thin film transistor is respectively formed in the semiconductor 154h/154l/154c between the source electrode 173h/173l/173c and the drain electrode 175h/175l/175c form a first/second/third thin film transistor (TFT) Qh/Ql/Qc.

Also, the semiconductors including the semiconductors 154h, 154l, and 154c except for the channel region between the source electrodes 173h, 173l, and 173c, and the drain electrodes 175h, 175l, and 175c have substantially the same shape as the data conductors 171, 175h, 175l, and 175c and the ohmic contacts 164b and 167. That is, the semiconductors including the semiconductors 154h, 154l, and 154c have a portion that is exposed without being covered by the data conductors 171, 175h, 175l, and 175c, and a portion between the source electrodes 173h, 173l, and 173c and the drain electrodes 175h, 175l, and 175c.

A lower passivation layer 180p made of an inorganic insulator such as silicon nitride or silicon oxide is formed on the data conductors 171, 175h, 175l, 175c and the exposed semiconductors 154h, 154l, and 154c.

A color filter 230 is formed on the lower passivation layer 180p. The color filter 230 is formed in most of the region except for where the first thin film transistor (Qh), the second thin film transistor (Ql), and the third thin film transistor (Qc) are positioned. Also, each color filter 230 may be formed lengthwise in a space in the longitudinal direction between the neighboring data lines 171. Each color filter 230 may display one of the primary colors, such as one of the three primary colors of red, green, and blue.

A light blocking member 220 is formed on a region that the color filter 230 does not occupy and also covers a portion of the edge of the color filter 230. The light blocking member 220 is referred to as a black matrix, and prevents light leakage. The light blocking member 220 is extended upward and downward along the gate line 121 and the step-down gate line 123, includes a first light blocking member 220a covering a region where the first thin film transistor Qh, the second thin film transistor Ql, and the third thin film transistor Qc are disposed, and a second light blocking member 220b extending along to the data line 171. A spacer 325 is formed on the light blocking member 220. Although not shown in the drawings, the spacer 325 may include a plurality of spacers that have different heights. In addition, the spacer 325 may be composed of a colored photosensitive material that includes a black pigment and the like, and the colored photosensitive material may have positive photosensitivity, and has the largest height and reduced height according to the cross-section. In addition, the spacer 325 may be made of the same material as the light blocking member 220.

On the color filter 230 and light blocking member 220, an upper passivation layer 180q is formed. The upper passivation layer 180q prevents peeling of the color filter 230 and light blocking member 220, and suppresses contamination of the liquid crystal layer 3 by an organic material of the solvent that inflows from the color filter 230, so that it prevents defects such as afterimages that may occur when an image is driven.

On the lower passivation layer 180p, the light blocking member 220, and the upper passivation layer 180q, a plurality of first contact holes 185h and a plurality of second contact holes 185l are formed that expose, respectively, the wide end portion of the first drain electrode 175h and the wide end portion of the second drain electrode 175l.

On the upper passivation layer 180q, a plurality of pixel electrodes 191 are formed.

Each pixel electrode 191 includes a first sub-pixel electrode 191h and a second sub-pixel electrode 191l that are separated from each other with two gate lines 121 and 123 therebetween and are disposed above and beneath the pixel area with the center of the gate lines 121 and 123 to be adjacent in a column direction, and the first sub-pixel electrode 191h and the second sub-pixel electrode 191l include one or more basic electrodes or modifications thereof shown in FIG. 6.

Hereinafter, referring to FIG. 6, the basic electrode will be described in detail.

As shown in FIG. 6, the entire shape of the basic electrode is quadrangular, and it includes a cross-shaped stem portion that is formed of a transverse stem portion 193 and a vertical stem portion 192 that is perpendicular thereto. In addition, the basic electrode 199 is divided into a first subregion Da, a second subregion Db, a third subregion Dc, and a fourth subregion Dd by the transverse stem portion 193 and the vertical stem portion 192, and each subregion Da-Dd includes a plurality of first to fourth fine branched portions 194a, 194b, 194c, and 194d.

The first fine branch portion 194a extends obliquely in an upper left direction from the transverse stem portion 193 and the vertical stem portion 192, and the second fine branch portion 194b extends obliquely in an upper right direction from the transverse stem portion 193 and the vertical stem portion 192. In addition, the third fine branch portion 194c extends obliquely in a down left direction from the transverse stem portion 193 and the vertical stem portion 192, and the fourth fine branch portion 194d extends obliquely in a down right direction from the transverse stem portion 193 and the vertical stem portion 192.

The first to fourth fine branch portions 194a, 194b, 194c, and 194d form an angle of approximately 45 degrees or 135 degrees with the gate lines 121 and 123 or the transverse stem portion 193. Further, the fine branch portions 194a, 194b, 194c, and 194d of the adjacent subregions Da, Db, Dc, and Dd may be orthogonal to each other.

The widths of the fine branched portions 194a, 194b, 194c, and 194d may be in the range of 2.5 to 5.0 µm, and a gap between the adjacent fine branched portions 194a, 194b, 194c, and 194d in one subregion Da, Db, Dc, or Dd may be in the range of 2.5 to 5.0 µm.

According to another embodiment, the widths of the fine branched portions 194a, 194b, 194c, and 194d may be wider where the fine branched portions are closer to the transverse stem portion 193 or the vertical stem portion 192. Further, a difference between the widest portion and the narrowest portion in one fine branched portion 194a, 194b, 194c, or 194d may be in the range of 0.2 to 1.5 µm.

The first sub-pixel electrode 191h and the second sub-pixel electrode 191l include a circumference stem portion that surrounds the circumference thereof, and the vertical portion of the circumference stem portion extends along the data line 171 and may prevent capacitive coupling between the data line 171 and the first sub-pixel electrode 191h and second sub-pixel electrode 191l.

The first sub-pixel electrode 191h and the second sub-pixel electrode 191l receive a data voltage through, respectively, the first contact hole 185h and the second contact hole 185l from the first drain electrode 175h and the second drain electrode 175l, respectively. The first sub-pixel electrode 191h and the second sub-pixel electrode 191l to which the data voltage is applied generate an electric field in conjunction with the common electrode 270 of the common electrode panel 200 to determine the direction of the liquid crystal molecules of the liquid crystal layer 3 between the two electrodes 191 and 270 are oriented. As described above, according to the determined orientation direction of the liquid crystal molecules, the luminance of light that passes through the liquid crystal layer 3 is changed.

The sides (edges) of the first to fourth fine branched portions 194a, 194b, 194c, and 194d distort the electric field and makes a horizontal component that determines an inclination direction of the liquid crystal molecules 31. The horizontal components of the electric field are substantially horizontal to the sides of the first to fourth fine branched portions 194a, 194b, 194c, and 194d. Therefore, as shown in FIG. 5, the liquid crystal molecules 31 are inclined in a direction that is parallel to a length direction of the fine branched portions 194a, 194b, 194c, and 194d. Because one pixel electrode 191 includes four subregions Da to Dd in which the length directions of the fine branched portions 194a, 194b, 194c, and 194d are different from each other, there are above four directions in which the liquid crystal molecules 31 are inclined, and four domains are formed in the liquid crystal layer where the alignment directions of the liquid crystal molecules 31 are different from each other. As described above, by diversifying the inclination direction of the liquid crystal molecules, the standard viewing angle of the liquid crystal display is increased.

The first sub-pixel electrode 191h and the common electrode 270 form the first liquid crystal capacitor Clch in conjunction with the liquid crystal layer 3 therebetween, and the second sub-pixel electrode 191l and common electrode 270 form the second liquid crystal capacitor Clcl in conjunction with the liquid crystal layer 3 therebetween, so that the applied voltage is maintained even though the first and second thin film transistors Qh and Ql are turned off.

The first and second sub-pixel electrodes 191h and 191l overlap the storage electrode 139 and the storage electrode line 125 to form the first and second storage capacitors Csth and Cstl. The first and second storage capacitors Csth and Cstl improve the ability of the first and second liquid crystal capacitors Clch and Clcl to maintain voltage.

The capacity electrode 136 and the expansion 177c of the third drain electrode 175c overlap the gate insulating layer 140 and semiconductor layers 157 and 167 therebetween to form a voltage drop capacitor Cstd. In another exemplary embodiment, the capacity electrode 136 and the expansion 177c of the third drain electrode 175c that constitute the voltage drop capacitor Cstd may be removed from the semiconductor layers 157 and 167 that are disposed therebetween.

On the pixel electrode 191 and the exposed upper passivation layer 180q, a lower alignment layer (not shown) is formed. The lower alignment layer may be a vertical alignment layer, and may be a dual layer including the vertical alignment layer and an alignment layer made of a photopolymer.

Now, the common electrode panel 200 will be described.

A common electrode 270 is formed on the insulation substrate 210. An upper alignment layer (not shown) is formed on the common electrode 270. The upper alignment layer may include the vertical alignment layer and the alignment layer made of the photopolymer.

A polarizer (not shown) may be provided on the outer surface of the two display panels 100 and 200, and it is preferable that transmissive axes of the two polarizers may be orthogonal to each other and any one transmissive axis of them is parallel to the gate line 121.

The liquid crystal layer 3 has negative dielectric anisotropy, and the liquid crystal molecules of the liquid crystal layer 3 may be aligned so that long axes thereof are vertical (perpendicular) with respect to the surface of the two display panels 100 and 200 in a state in which there is no electric field. Therefore, the incident light does not pass through the crossed polarizers but is blocked in a state in which there is no electric field.

As described above, because the first sub-pixel electrode 191h and the second sub-pixel electrode 191l to which the data voltage is applied generate an electric field in conjunction with the common electrode 270 of the common electrode panel 200, the liquid crystal molecules of the liquid crystal layer 3, which are aligned vertically with respect to the surfaces of the two electrodes 191 and 270 in a state in which there is no electric field, are inclined in a horizontal direction with respect to the surfaces of the two electrodes 191 and 270 when the data voltage is applied. The luminance of light that passes through the liquid crystal layer 3 is changed according to the degree of inclination of the liquid crystal molecule.

The magnitude of the voltage applied to the first sub-pixel electrode 191a and the second sub-pixel electrode 191b is changed by the step-down capacitor, and the voltage of the first sub-pixel electrode 191a having a relatively small area may be higher than the voltage of the second sub-pixel electrode 191b having a relatively large area.

In this way, if the voltages of the first sub-pixel electrode 191a and the second sub-pixel electrode 191b are different from each other, the voltages affecting the liquid crystal capacitors Clca and Clcb formed at two pixel electrodes 191a and 191b are different from each other such that the inclination angle of the liquid crystal molecules of the subpixels PXa and PXb are different from each other. Accordingly, if the voltages of the first and second liquid crystal capacitors Clca and Clcb are appropriately controlled, the images shown at the side may approximate the images shown at the front, thereby improving the side visibility.

The pixel of the liquid crystal panel PN of the present exemplary embodiment includes the step-down capacitor Cstd and the two sub-pixel electrodes 191a and 191b, however this particular pixel structure is only one example, and many characteristics of the present disclosure may be applied to liquid crystal panels PN that include a pixel electrodes similar to the basic electrode shown in FIG. 6.

The liquid crystal panel PN according to an exemplary embodiment includes the liquid crystal layer interposed between two display panels 100 and 200, and the liquid crystal layer is initially aligned to have a pretilt.

Figure 7:
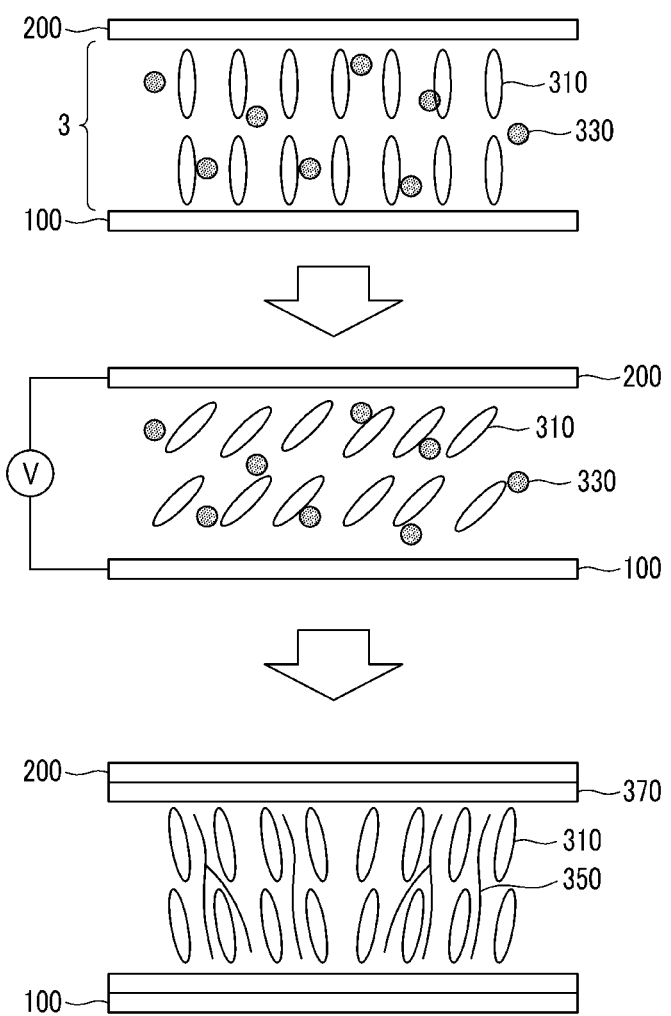
FIG. 7 is a view showing a process of providing a pretilt angle to liquid crystal molecules by using prepolymers that are polarized by light such as ultraviolet rays.

Next, an initial alignment method for providing the pretilt to the liquid crystal molecule of the liquid crystal layer will be described with reference to FIG. 7. FIG. 7 is a view showing a process of providing a pretilt angle to liquid crystal molecules by using prepolymers that are polarized by light such as ultraviolet rays.

Firstly, prepolymers 330 such as a monomer that is polymerized by light such as ultraviolet rays are injected along with a liquid crystal material between the two display panels 100 and 200. The prepolymer 330 may be a reactive mesogen that is polymerized by light such as ultraviolet rays.

Next, voltages are applied to the gate lines and the data lines that are formed on the thin film transistor array panel 100 so as to apply the data voltage to the first and second subpixel electrodes, and a common voltage is applied to the common electrode of the upper panel 200, thereby forming an electric field across the liquid crystal layer 3 between the two display panels 100 and 200.

In response to the electric field, the liquid crystal molecules 310 of the liquid crystal layer 3 are tilted in the direction parallel to the length direction of the minute branches 194a-194d, and there are four different direction in which the liquid crystal molecules 310 in one pixel PX are inclined.

After generating the electric field to the liquid crystal layer 3, if the liquid crystal layer 3 is irradiated with light such as ultraviolet rays, the prepolymers 330 are polymerized to form first polymers 350 and second polymers 370, as shown in FIG. 7.

The first polymers 350 are formed in the liquid crystal layer 3, and the second polymers 370 are formed in contact with the display panels 100 and 200. The alignment directions of the liquid crystal molecules 310 are determined to have the pretilt in the length direction of the minute branches 194a-194d by the first and second polymers 350 and 370.

Accordingly, even when voltage is not applied to the electrodes 191 and 270, the liquid crystal molecules 310 are arranged with the pretilt in one of the four different directions depending upon their position within the pixel PX.

In this way, the liquid crystal layer 3 of the liquid crystal panel according to an exemplary embodiment is initially aligned through the irradiation of the light to the two display panels 100 and 200 while also under the application of the voltage. According to a manufacturing method of a display panel according to an exemplary embodiment, the voltage application to the two display panels 100 and 200 for the initial alignment is not executed as a unit to each individual liquid crystal panel PN, but as a unit of the display panel that includes a plurality of liquid crystal panels PN, and the gate line and the data line connected to the pixel electrode may be separately applied with the voltages of the desired magnitude.

A manufacturing method of a display panel including liquid crystal panels for a liquid crystal display will now be described with reference to FIG. 8 to FIG. 13 as well as FIG. 1. FIG. 8 to FIG. 13 are views sequentially showing a manufacturing method of a display panel according to an exemplary embodiment. In FIG. 8 to FIG. 13, only one liquid crystal panel PN is shown, however as above-described, the display panel according to an exemplary embodiment includes a plurality of liquid crystal panels.

Figure 8:
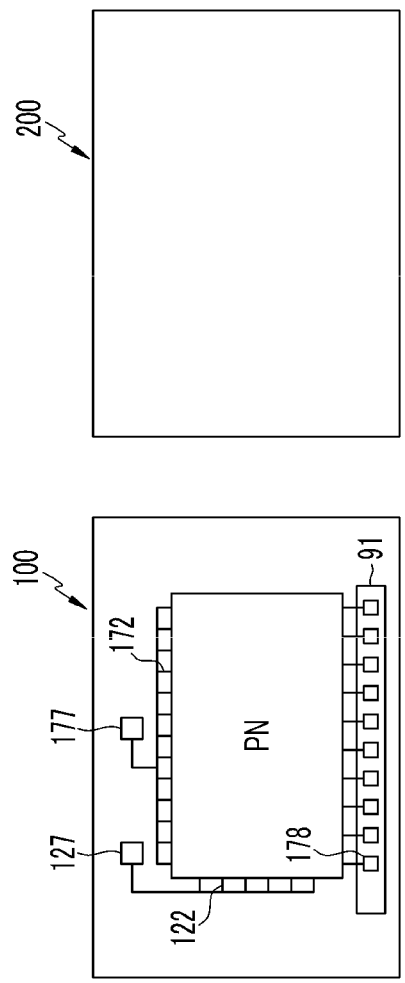

Referring to FIG. 8, a thin film transistor array panel 100 is formed including a plurality of pixels, a gate driving signal line 122 connected to the gate line 121 of each pixel, a gate driving pad 127 connected to the gate driving signal line 122, a data driving signal line 172 connected to the data line 171 of each pixel, a data driving pad 177 connected to the data driving signal line 172, a data test pad 178 connected to each data line 171, and a first connecting member 91 connecting a plurality of data test pads 178. A common electrode panel 200 including a common electrode (not shown) is also formed. Through the first connecting member 91 connected to the data test pad 178 of the thin film transistor array panel 100, a test signal is applied to test for any defects in each thin film transistor and the signal lines of the thin film transistor array panel 100.

Figure 9:
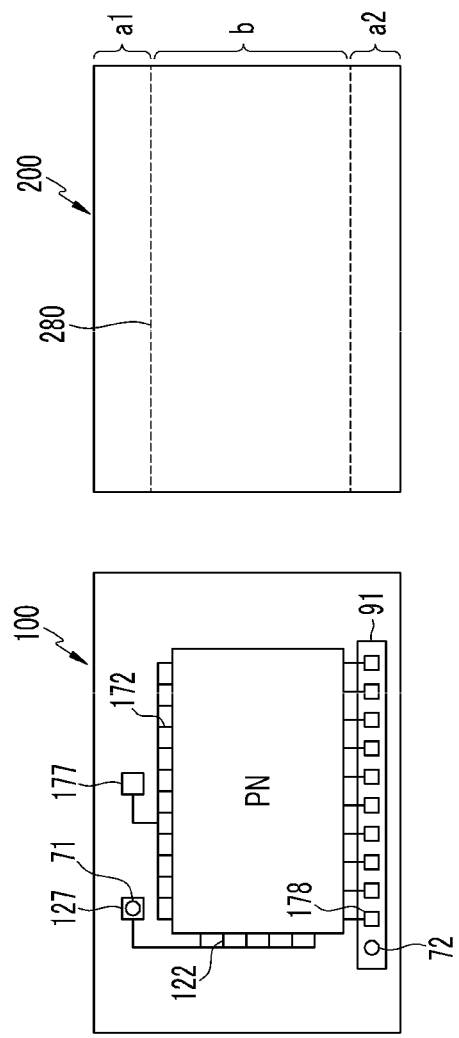
Figure 13:
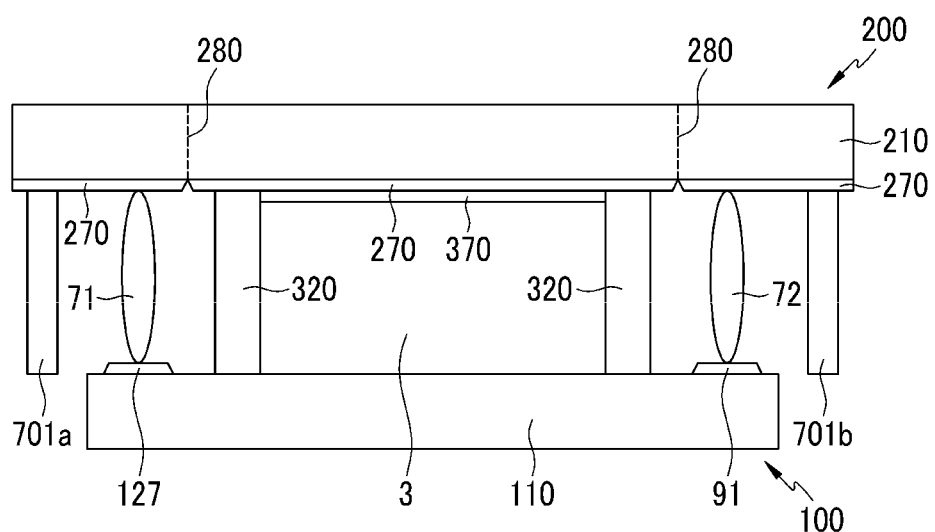

Next, as shown in FIG. 9, the first short point 71 is formed at the gate driving pad 127 of the thin film transistor array panel 100, and the second short point 72 is formed at the data test pad 178. The first short point 71 and the second short point 72 may made, for example, of molybdenum (Mo), copper (Cu), aluminum (Al), nickel (Ni), platinum (Pt), gold (Au), silver (Ag), or chromium (Cr). The first short point 71 and the second short point 72 may be formed by a paste method using a needle.

Also, the region division lines 280 are formed in the common electrode panel 200, and the common electrode 270 of the common electrode panel is divided into the plurality of regions a1, a2, and b.

Next, as shown in FIG. 10, a sealant 320 is printed on either the thin film transistor array panel 100 or the common electrode panel 200. The sealant 320 is respectively disposed along the circumference of each liquid crystal panel PN in a closed line. In detail, the sealant 320 is formed to enclose the circumference of the display area including the plurality of pixel electrodes of the liquid crystal panel PN, and at least a portion of the sealant 320 may be disposed on the gate driving signal line 122 and the data driving signal line 172. The liquid crystal material 3 is then injected into the portion enclosing the sealant 320. Next, the thin film transistor array panel 100 and the common electrode panel 200 are aligned to face each other, and a uniform pressure is applied to combine the thin film transistor array panel 100 and the common electrode panel 200.

The liquid crystal layer 3 is thus injected only into the region the enclosed by the sealant 320 in the region b. Also, the alignment layer, in particular the vertical alignment layer, is formed on the surface of the thin film transistor array panel 100 and the common electrode panel 200, and is formed in the entire area of region b, and may also be at least partially formed in regions a1 and a2.

A step of forming the region division lines 280 in the common electrode panel 200 may alternatively be performed after adhering the thin film transistor array panel 100 and the common electrode panel 200.

Next, as shown in FIG. 11, the portion C along the edge of the thin film transistor array panel 100 is removed to expose a portion of the common electrode panel 200 corresponding to the regions in which the voltage application units 701a, 701b, and 702 are to be positioned on the common electrode panel 200.

Next, as shown in FIG. 12, the first voltage application unit 701a, second voltage application unit 701b, and third voltage application unit 702 are connected to the common electrode panel 200 and electrically connected to the common electrode 270 in, respectively, regional, region a2 and region b. Then, a first voltage is applied to the first voltage application unit 701a of the first region a1, a second voltage is applied to the second voltage application unit 701b of the second region a2, and a third voltage is applied to the third voltage application unit 702 of the third region b. Voltage application means such as, for example, a voltage application pin or probe may be used to apply the first to third voltages to the first voltage application unit 701a, the second voltage application unit 701b, and the third voltage application unit 702. The first voltage applied to the first voltage application unit 701a passes through the common electrode 270 formed in the common electrode panel of the first region a1 and is transmitted to the gate driving pad 127 of the thin film transistor array panel through the first short point 71, and then is applied to each of the gate lines 121. At this time, the gate driving pad 127 and the gate lines 121 that are formed in a plurality of the liquid crystal panels in the first region a1 are simultaneously applied with the voltage, and the gate lines 121 connected to the pixel electrode of a plurality of liquid crystal panels are simultaneously applied with the first voltage.

The second voltage applied to the second voltage application unit 701b passes through the common electrode 270 formed in the common electrode panel of the second region a2 and is transmitted to the first connecting member 91 of the thin film transistor array panel through the second short point 72, and then is applied to each of the data line 171 connected to each pixel through the data test pad 128 that is connected to the first connecting member 91. At this time, the second voltage is simultaneously applied to the first connecting member 91 that is connected to the data test pads 178 of the plurality of liquid crystal panels PN that are formed in the second region a2, such that the second voltage is simultaneously applied to the data lines 171 connected to the pixel electrodes of the plurality of liquid crystal panels.

The third voltage applied through the third voltage application unit 702 of the third region b is applied to the common electrode 270 of the common electrode panel, and the third voltage is simultaneously applied to the common electrode 270 of the plurality of liquid crystal panels PN formed in the third region b.

The third region is a region corresponding to the plurality of pixel electrodes of each of the liquid crystal panels PN.

As described above, the thin film transistor array panel and the common electrode panel are irradiated with light, such as ultraviolet rays, at the same time as the electric field is generated across the liquid crystal layer between the thin film transistor array panel and the common electrode panel. To generate the electric field across the liquid crystal layer, voltages are applied to the plurality of liquid crystal panels: the voltage of the desired magnitude is applied to the plurality of gate lines and the plurality of data lines connected to the plurality of pixel electrodes of each liquid crystal panel at the same time as the common voltage is applied to the common electrode of the common electrode panel. Thus, the second polymer layer 370 is formed on the surface of the thin film transistor array panel 100 and the common electrode panel 200 of the region enclosed by the sealant 320 and injected with the liquid crystal layer 3 with an initial alignment, and the aligned second polymer layer 370 is formed on the plurality of liquid crystal panels PN simultaneously. In this way, the liquid crystal layer 3 of the liquid crystal panel according to an exemplary embodiment is initially aligned to have the pretilt through the photoirradiation in the state that the voltage is applied to two display panels 100 and 200. According to a manufacturing method of a display panel according to an exemplary embodiment, the voltage application to the two display panels 100 and 200 for the initial alignment is not executed individually for each liquid crystal panel PN, but as a unit for the whole display panel including a plurality of liquid crystal panels PN, and the gate line and the data line connected to the pixel electrode may be separately applied with the voltage of the desired magnitude. The liquid crystal molecules in the liquid crystal layer are arranged according to the lengthwise direction of the fine branches 194a-194d of the basic electrode shown in FIG. 6 by the electrode field across the liquid crystal layer. The electric field across the liquid crystal layer is generated by the voltages applied to pixel electrode and the common electrode, where the voltage applied to the pixel electrode is the second voltage applied to the data line and the voltage applied to the common electrode 270 is the common voltage. As a result of the polymerization for the prepolymer included in the liquid crystal layer 3 via to the irradiation of ultraviolet rays, the first polymer 350 and the second polymer 370 are generated and provide an alignment direction of the liquid crystal molecules 31 with the pretilt in the length direction of the fine branches 194a-194d of the pixel electrode.

As described above, according to the manufacturing method of the display panel according to an exemplary embodiment, the gate line and the data line formed in the thin film transistor array panel of a plurality of panels and the common electrode formed in the common electrode panel may be applied with the voltage of the desired magnitude, and, in the initial photoalignment process, the voltage is applied to the display panel as the mother panel glass including a plurality of cells of the liquid crystal display such that the manufacturing cost is simultaneously reduced. Furthermore, different voltages may be applied to the gate line and the data line of each cell such that the accuracy of the initial alignment may be increased.

Figure 14:
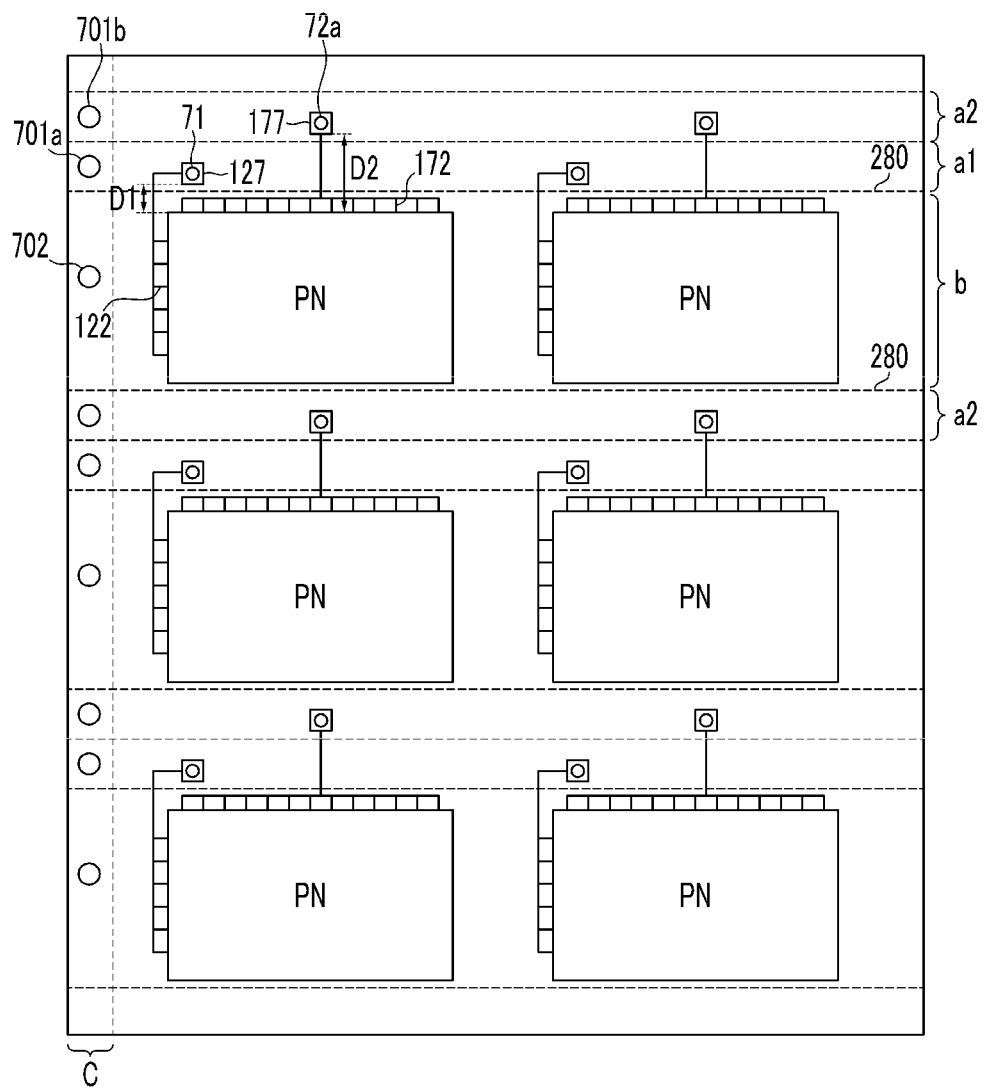
FIG. 14 is a top plan view of a manufacturing method of a display panel according to another exemplary embodiment.

A manufacturing method of a display panel according to another exemplary embodiment will be described with reference to FIG. 14. FIG. 14 is a top plan view of a manufacturing method of a display panel according to another exemplary embodiment.

A display panel made of one mother glass panel and completed through an assembly process of substrates in a manufacturing method of a display panel according to an exemplary embodiment shown in FIG. 14 is similar to the display panel according to the exemplary embodiment shown in FIG. 1.

Like the exemplary embodiment shown in FIG. 1, the display panel is divided into the first region a1, the second region a2, and the third region b. The first voltage application unit 701a is formed in the first region a1, the second region a2 includes the second voltage application unit 701b, and the third region b includes the third voltage application unit 702. The voltage application units 701a, 701b, and 702 are connected to the pin or the probe for application of a voltage.

However, unlike the exemplary embodiment shown in FIG. 1, the gate driving pad 127 of the first region a1 is formed with the first short point 71, and the data driving pad 177 of the second region a2 is formed with a third short point 72a.

A manufacturing method of the display panel according to the present exemplary embodiment forms the data test pad in the liquid crystal panel PN, and the gate driving pad 127 and the data driving pad 177 are formed at different positions. In detail, the interval D1 between the liquid crystal panel PN and the gate driving pad 127 and the interval D2 between the liquid crystal panel PN and the data driving pad 177 are different by the first interval D3, thereby dividing the first region a1 and the second region a2. Accordingly, the light of ultraviolet rays is irradiated in the state that the liquid crystal layer is applied between the thin film transistor array panel and the common electrode panel after the gate driving pad 127 is formed in the first region a1 and the data driving pad 177 is formed in the second region a2, and through the first short point 71 formed in the gate driving pad 127, the first voltage is applied to the gate line 121, while through the third short point 72a formed in the data driving pad 177, the second voltage is applied to the data line 171 and the third voltage is applied to the common electrode 270 formed in the third region b, and thereby a plurality of liquid crystal panels may be simultaneously and initially aligned.

The manufacturing method of the display panel according to the present exemplary embodiment will now be described in detail.

Firstly, the thin film transistor array panel 100 is formed including a plurality of pixels including at least one pixel electrode of the shape of the basic electrode shown in FIG. 6, the gate driving signal line 122 connected to the gate line 121 of each pixel, the gate driving pad 127 connected to the gate driving signal line 122, the data driving signal line 172 connected to the data line 171 of each pixel, and the data driving pad 177 connected to the data driving signal line 172. The common electrode panel 200 is formed including the common electrode 270. The positions of the gate driving pad 127 and the data driving pad 177 are different from each other. In detail, the interval D1 to the gate driving pad 127 from the liquid crystal panel PN and the interval D2 to the data driving pad 177 from the liquid crystal panel PN is different by the first interval D3, thereby dividing the first region a1 and the second region a2.

The first short point 71 is formed in the gate driving pad 127 of the thin film transistor array panel, and the third short point 72a is formed in the data driving pad 177.

The region division lines 280 are formed in the common electrode panel, and the common electrode 270 of the common electrode panel is divided into a plurality of regions a1, a2, and b. However, the step of forming the region division lines 280 in the common electrode panel may be performed after combining the thin film transistor array panel with the common electrode panel.

The sealant is printed on either the thin film transistor array panel or the common electrode panel to form the enclosed line for the liquid crystal panel PN at the circumference of each liquid crystal panel PN. Next, after the liquid crystal material is inserted into the portion enclosed by the sealant, the thin film transistor array panel and the common electrode panel are aligned to face each other and uniform pressure is applied to adhere the thin film transistor array panel to the common electrode panel.

Next, a portion along the edge of the thin film transistor array panel is removed to expose a portion of the common electrode panel 200 corresponding to the regions in which the voltage application units 701a, 701b, and 702 are to be positioned.

Next, the first, second, and third voltage application units 701a, 701b and 702 are connected to the common electrode panel 200. Then, a first voltage is applied to the first voltage application unit 701a of the first region a1, a second voltage is applied to the second voltage application unit 701b of the second region a2, and a third voltage is applied with the third voltage application unit 702 of the third region b.

The first voltage applied to the first voltage application unit 701a passes through the common electrode 270 formed in the common electrode panel of the first regional and is transmitted to the gate driving pad 127 of the thin film transistor array panel through the first short point 71, and then is applied to each of the gate lines 121 connected to each pixel. At this time, the gate driving pad 127 and the gate lines 121 that are formed in a plurality of the liquid crystal panels in the first region a1 are simultaneously applied with the voltage, and the gate lines 121 connected to the pixel electrode of a plurality of liquid crystal panels is simultaneously applied with the first voltage.

The second voltage applied to the second voltage application unit 701b passes through the common electrode 270 formed in the common electrode panel of the second region a2 and is transmitted to the data driving pad 177 of the thin film transistor array panel through the third short point 72a, and then is applied to each of the data lines 171 connected to each pixel. At this time, the second voltage is simultaneously applied to the data driving pad 177 and the data lines 171 of the plurality of liquid crystal panels formed in the second region a2 such that the second voltage is simultaneously applied to the data lines 171 connected to the pixel electrodes of the plurality of liquid crystal panels.

The third voltage applied through the third voltage application unit 702 of the third region b is applied to the common electrode 270 of the common electrode panel, and the third voltage is simultaneously applied to the common electrode 270 of the plurality of liquid crystal panels PN formed in the third region b.

The third region is a region corresponding to a plurality of pixel electrodes of the liquid crystal panel PN.

As described above, the thin film transistor array panel and the common electrode panel are irradiated with light, such as ultraviolet rays, at the same time as an electric field is generated across the liquid crystal layer between the thin film transistor array panel and the common electrode panel. To generate the electric field across the liquid crystal layer, voltages are applied to the plurality of liquid crystal panels: the voltage of the desired magnitude is applied to the plurality of gate lines and the plurality of data lines connected to the plurality of pixel electrodes of each liquid crystal panel at the same time as the common voltage is applied to the common electrode of the common electrode panel. As a result, the initial alignment of the polymer layer 370 in the plurality of liquid crystal panels PN on the display panel occurs simultaneously.

As described above, according to the manufacturing method of the display panel according to an exemplary embodiment, the gate line and the data line formed in the thin film transistor array panel of a plurality of panels and the common electrode formed in the common electrode panel may be applied with the voltage of the desired magnitude, and in the initial photo alignment process, the voltage is applied to the display panel as the mother panel glass including a plurality of cells of the liquid crystal display such that the manufacturing cost is simultaneously reduced. Furthermore, different voltages may be applied to the gate line and the data line of each cell such that the accuracy of the initial alignment may be increased.

All characteristics according to the exemplary embodiment described with reference to FIG. 1 to FIG. 13 may be applied to the manufacturing method of the display panel according to the present exemplary embodiment.

Figure 15:
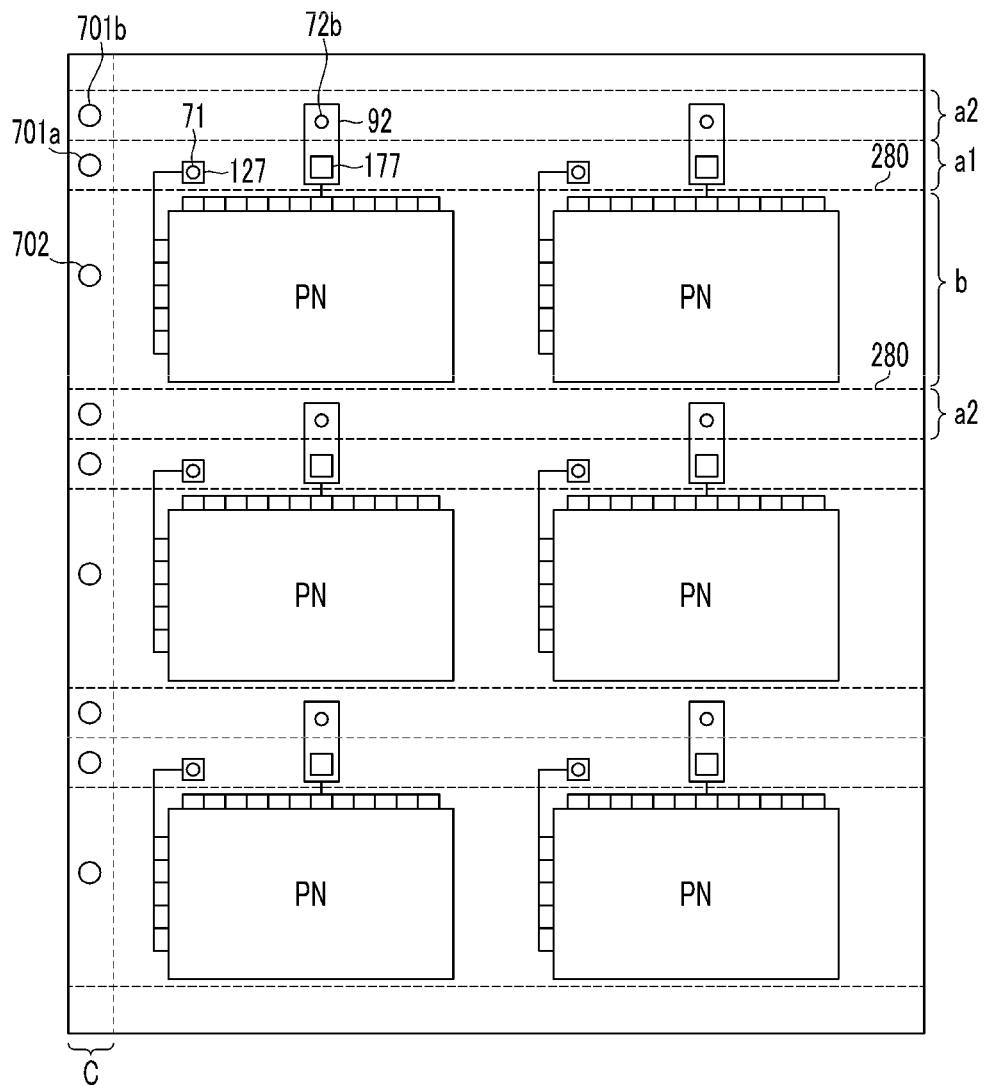
FIG. 15 is a top plan view of a manufacturing method of a display panel according to another exemplary embodiment.

A manufacturing method of a display panel according to another exemplary embodiment will be described with reference to FIG. 15. FIG. 15 is a top plan view of a manufacturing method of a display panel according to another exemplary embodiment.

A display panel made of one mother glass panel and completed through an assembly process of substrates in a manufacturing method of a display panel according to an exemplary embodiment shown in FIG. 15 is similar to the display panel according to the exemplary embodiments shown in FIG. 1 and FIG. 14.

Like the exemplary embodiments of FIG. 1 and FIG. 14, the display panel is divided into the first region a1, the second region a2, and the third region b. The first voltage application unit 701a is formed in the first region a1, the second region a2 includes the second voltage application unit 701b, and the third region b includes the third voltage application unit 702. The voltage application units 701a, 701b, and 702 are connected to the pin or the probe for application of the voltage.

Differently from the exemplary embodiments shown in FIG. 1 and FIG. 14, the data driving pad 177 of each liquid crystal panel PN is formed at the first region a1 at the position similar to the gate driving pad 127, however the data driving pad 177 is connected to a second connecting member 92 and the second connecting member 92 is extended to the second region a2. Also, a fourth short point 72b is formed at the portion where the second region a2 is disposed along the second connecting member 92. Accordingly, the first short point 71 is formed at the gate driving pad 127 of the first regional, and the fourth short point 72b is formed on the second connecting member 92 of the second region a2.

In the manufacturing method of the display panel according to the present exemplary embodiment, the data test pad is formed in the liquid crystal panel PN and the positions of the gate driving pad 127 and the data driving pad 177 are similar to each other. However, the second connecting member 92 covering the contact hole exposing the data driving pad 177 is extended to the second region a2 and the fourth short point 72b is formed on the second connecting member 92 disposed at the second region a2 such that the region where the first short point 71 is formed and the region where the fourth short point 72b is formed may be easily divided. However, differently from this, the gate driving pad according to another exemplary embodiment may be formed to be connected to the additional connecting member and the position of the connecting member may be formed to be different from the position of the data driving pad.

Through the first short point 71 formed at the gate driving pad 127 disposed at the first region a1, the gate lines 121 are applied with the first voltage, through the fourth short point 72b formed at the second connecting member 92 connected to the data driving pad 177, the data lines 171 are applied with the second voltage and the common electrode 270 formed at the third region b is applied with the third voltage. Light, such as ultraviolet rays, is irradiated when the electric field is generated across the liquid crystal layer between the thin film transistor array panel and the common electrode panel, and thereby a plurality of liquid crystal panels may be simultaneously and initially aligned.

The manufacturing method of the display panel according to the present exemplary embodiment will be described in detail.

Firstly, the thin film transistor array panel is formed including a plurality of pixels including at least one pixel electrode similar to the basic electrode shown in FIG. 6, the gate driving signal line 122 connected to the gate line 121 of each pixel, the gate driving pad 127 connected to the gate driving signal line 122, the data driving signal line 172 connected to the data line 171 of each pixel, the data driving pad 177 connected to the data driving signal line 172, and the second connecting member 92 covering the data test pad 178 exposed through the contact hole (not shown). The common electrode panel 200 is formed including the common electrode 270.

The first short point 71 of the thin film transistor array panel is formed at the gate driving pad 127, and the fourth short point 72b is formed at the second connecting member 92 covering the data driving pad 177.

The region division lines 280 are formed at the common electrode panel to divide the common electrode 270 of the common electrode panel is divided into a plurality of regions a1, a2, and b. However, the step of forming the region division lines 280 in the common electrode panel may be performed after combining the thin film transistor array panel with the common electrode panel.

The sealant is printed on either the thin film transistor array panel or the common electrode panel to form the enclosed line for the liquid crystal panel PN at the circumference of each liquid crystal panel PN. Next, after the liquid crystal material is inserted into the portion enclosed by the sealant, the thin film transistor array panel and the common electrode panel are aligned to face each other and uniform pressure is applied to adhere the thin film transistor array panel to the common electrode panel.

Next, the portion along the edge of the thin film transistor array panel is removed to expose a portion of the common electrode panel 200 corresponding to the regions in which the voltage application units 701a, 701b, and 702 of the common electrode panel are to be positioned.

Next, the first, second, and third voltage application units 701a, 701b and 702 are connected to the common electrode panel 200. Then, a first voltage is applied to the first voltage application unit 701a of the first region a1, a second voltage is applied to the second voltage application unit 701b of the second region a2, and a third voltage is applied to the third voltage application unit 702 of the third region b.

The first voltage applied to the first voltage application unit 701a passes through the common electrode 270 formed in the common electrode panel of the first regional and is transmitted to the gate driving pad 127 of the thin film transistor array panel through the first short point 71, and then is applied to each of the gate lines 121 connected to each pixel. At this time, the gate driving pad 127 and the gate lines 121 that are formed in a plurality of the liquid crystal panels in the first region a1 are simultaneously applied with the voltage, and the gate line 121 connected to the pixel electrode of a plurality of liquid crystal panels is simultaneously applied with the first voltage.

The second voltage applied to the second voltage application unit 701b passes through the common electrode 270 formed in the common electrode panel of the second region a2 and is transmitted to the second connecting member 92 of the thin film transistor array panel through the fourth short point 72b formed at the second connecting member 92, and then is applied to each of the data lines 171 connected to each pixel through the data driving pad 177 connected to the second connecting member 92. At this time, the second driving voltage is simultaneously applied to the second connecting member 92 connected to the data driving pad 177 of the plurality of liquid crystal panels formed at the second region a2 such that the second voltage is simultaneously applied to the data lines 171 connected to the pixel electrodes of the plurality of liquid crystal panels.

The third voltage applied through the third voltage application unit 702 of the third region b is applied to the common electrode 270 of the common electrode panel, and the third voltage is simultaneously applied to the common electrode 270 of the plurality of liquid crystal panels PN formed in the third region b.

The third region is a region corresponding to a plurality of pixel electrodes of the liquid crystal panel PN.

As described above, the thin film transistor array panel and the common electrode panel are irradiated with light, such as ultraviolet rays, at the same time as an electric field is generated across the liquid crystal layer between the thin film transistor array panel and the common electrode panel. To generate the electric field across the liquid crystal layer, voltages are applied to the plurality of liquid crystal panels: the voltage of the desired magnitude is applied to the plurality of gate lines and the plurality of data lines connected to the plurality of pixel electrodes of each liquid crystal panel at the same time as the common voltage is applied to the common electrode of the common electrode panel. As a result, the initial alignment of the polymer layer 370 in the plurality of liquid crystal panels PN on the display panel occurs simultaneously.

As described above, according to the manufacturing method of the display panel according to an exemplary embodiment, the gate line and the data line formed in the thin film transistor array panel of a plurality of panels and the common electrode formed in the common electrode panel may be applied with the voltage of the desired magnitude, and in the initial photoalignment process, the voltage is applied to the display panel as the mother panel glass including a plurality of cells of the liquid crystal display such that the manufacturing cost is simultaneously reduced. Furthermore, different voltages may be applied to the gate line and the data line of each cell such that the accuracy of the initial alignment may be increased.

All characteristics of the manufacturing method of the display panel according to the exemplary embodiments shown in FIG. 1 to FIG. 7, and FIG. 8, may be applied to the manufacturing method of the display panel according to the present exemplary embodiment.

The exemplary embodiments according to the present disclosure may be applied to all display panels that are initially aligned after the initial electric field is formed to the field generating electrode.

While various embodiments has been described in connection with what is presently considered to be practical exemplary embodiments, it is to be understood that the invention is not limited to the disclosed embodiments, but, on the contrary, is intended to cover various modifications and equivalent arrangements included within the spirit and scope of the disclosure, including the appended claims.

What is claimed is:

1. A method of manufacturing a display panel, comprising:
    forming a first display panel, the first display panel including a first liquid crystal panel and a second liquid crystal panel separated from the first liquid crystal panel, the first liquid crystal panel including,
        a plurality of pixel electrodes,
        a plurality of gate lines connected to the plurality of pixel electrodes,
        a first pad unit connected to the plurality of gate lines,
        a plurality of data lines connected to the plurality of pixel electrodes, and
        a second pad unit connected to the plurality of data lines and comprising a plurality of pads connected to the plurality of data lines;
    the second liquid crystal panel including,
        a second plurality of pixel electrodes,
        a second plurality of gate lines connected to the second plurality of pixel electrodes,
        a third pad unit connected to the second plurality of gate lines,
        a second plurality of data lines connected to the second plurality of pixel electrodes, and
        a fourth pad unit connected to the second plurality of data lines and comprising a second plurality of pads connected to the second plurality of data lines,
    forming a connecting member connecting the second pad unit and the plurality of pads connected to data lines of the first liquid crystal panel to the fourth pad unit and the second plurality of pads connected to the second plurality of data lines of the second liquid crystal panel,
    forming a second display panel including a common electrode;
    forming a first short point connected to the first pad unit and the third pad unit;
    forming a second short point connected to the connecting member;
    aligning and adhering the first display panel and the second display panel;
    dividing the second display panel into a plurality of regions insulated from each other, a first region positioned to correspond to the first short point, a second region positioned to correspond to the second short point, and a third region; and
    applying a first voltage to the first region, a second voltage to the second region, and a third voltage to the third region.

2. The method of claim 1, wherein
one of the first pad unit and the second pad unit is a driving pad.

3. The method of claim 2, wherein
one of the first short point and the second short point is formed on the driving pad.

4. The method of claim 1, wherein
the first short point and the second short point electrically connect the first display panel and the second display panel and are formed in the first display panel or the second display panel.

5. The method of claim 1, wherein
the dividing of the second display panel into the plurality of regions insulated from each other divides the common electrode into a plurality of electrodes insulated from each other.

6. The method of claim 5, wherein
the dividing of the second display panel into a plurality of regions insulated from each other uses a laser.

7. The method of claim 1, wherein
the first voltage applied to the first region is transmitted to the first short point through the common electrode of the second display panel and is transmitted to the gate line through the first short point.

8. The method of claim 1, wherein
the second voltage applied to the second region is transmitted to the second short point through the common electrode of the second display panel and is transmitted to the data line through the second short point.

9. The method of claim 1, wherein
the third voltage applied to the third region is only transmitted to the common electrode of the second display panel.

10. The method of claim 1, wherein
one of the first pad unit and the second pad unit is a test pad.

11. The method of claim 10,
wherein the second short point is formed on the connecting member.

12. A method of manufacturing a display panel, comprising:
forming a first display panel, the first display panel including a plurality of liquid crystal panels, each liquid crystal panel including
a plurality of pixel electrodes,
a plurality of gate lines connected to the plurality of pixel electrodes,
a first pad unit connected to the plurality of gate lines,
a plurality of data lines connected to the plurality of pixel electrodes, and
a second pad unit connected to the plurality of data lines;
forming a second display panel including a common electrode;
forming a first short point connected to the first pad unit;
forming a second short point connected to the second pad unit;
aligning and adhering the first display panel and the second display panel;
dividing the common electrode on the second display panel into a plurality of regions insulated from each other, wherein along a first row of liquid crystal panels a first region is positioned to correspond to the first short point, a second region is positioned adjacent to the first region to correspond to the second short point, and a third region is positioned adjacent to the first region opposite the second region to correspond to the pixel electrodes, gate lines, and data lines, and wherein, along a second row of liquid crystal panels adjacent to the first row of liquid crystal panels, a fourth region is positioned adjacent to the third region along the first row of liquid crystal panels and a fifth region is positioned adjacent the fourth region opposite the third region, and the fourth region includes a second first short point connected to a second first pad unit and the fifth region includes a second second short point; and
applying a first voltage to the first region, a second voltage to the second region, and a third voltage to the third region, wherein
a first interval between the first pad unit and the plurality of pixel electrodes is different than a second interval between the second pad unit and the plurality of pixel electrodes, and
at least one of the first pad unit and the second pad unit is a driving pad.

13. The method of claim 12, wherein
the first short point and the second short point electrically connect the first display panel and the second display panel to each other, and are formed in the first display panel or the second display panel.

14. The method of claim 12, wherein
the dividing of the second display panel into the plurality of regions insulated from each other divides the common electrode into a plurality of electrodes insulated from each other.

15. The method of claim 14, wherein
the dividing of the second display panel into the plurality of regions insulated from each other includes using a laser.

16. The method of claim 12, wherein
the first voltage applied to the first region is transmitted to the first short point through the common electrode of the second display panel and is transmitted to the gate line through the first short point.

17. The method of claim 12, wherein
the second voltage applied to the second region is transmitted to the second short point through the common electrode of the second display panel and is transmitted to the data line through the second short point.

18. The method of claim 12, wherein
the third voltage applied to the third region is only transmitted to the common electrode of the second display panel.

19. A method of manufacturing a display panel, comprising:
forming a first display panel, the first display panel including a plurality of liquid crystal panels, each liquid crystal panel including
a plurality of pixel electrodes,
a plurality of gate lines connected to the plurality of pixel electrodes,
a first pad unit connected to the plurality of gate lines,
a plurality of data lines connected to the plurality of pixel electrodes, and
a second pad unit connected to the plurality of data lines;
a connecting member connected to the second pad unit,
forming a second display panel including a common electrode;
forming a first short point connected to the first pad unit;
forming a second short point connected to the second pad unit;
aligning and adhering the first display panel and the second display panel;
dividing the common electrode on the second display panel into a plurality of regions insulated from each other, wherein along a first row of liquid crystal panels a first region is positioned to correspond to the first short point, a second region is positioned adjacent to the first region to correspond to the second short point, and a third region is positioned adjacent to the first region opposite the second region to correspond to the pixel electrodes, gate lines, and data lines, and wherein, along a second row of liquid crystal panels adjacent to the first row of liquid crystal panels, a fourth region is positioned adjacent to the third region along the first row of liquid crystal panels and a fifth region is positioned adjacent the fourth region opposite the third region, and the fourth region includes a second first short point connected to a second first pad unit and the fifth region includes a second second short point; and
applying a first voltage to the first region, a second voltage to the second region, and a third voltage to the third region, wherein a first interval between the first pad unit and the plurality of pixel electrodes and a second interval between the second pad unit and a plurality of pixel electrodes are formed to be the same,
wherein the connecting member is formed in the second region and the second short point is formed on the connecting member, and
at least one of the first pad unit and the second pad unit is a driving pad.

20. The method of claim 19, wherein:
the first short point and the second short point electrically connect the first display panel and the second display panel to each other, and are formed in the first display panel or the second display panel.

21. The method of claim 19, wherein
the dividing of the second display panel into the plurality of regions insulated from each other divides the common electrode into a plurality of electrodes insulated from each other.

22. The method of claim 21, wherein
the dividing of the second display panel into the plurality of regions insulated from each other includes using a laser.

23. The method of claim 19, wherein
the first voltage applied to the first region is transmitted to the first short point through the common electrode of the second display panel and is transmitted to the gate line through the first short point.

24. The method of claim 19, wherein
the second voltage applied to the second region is transmitted to the second short point through the common electrode of the second display panel and is transmitted to the data line through the second short point.

25. The method of claim 19, wherein
the third voltage applied to the third region is only transmitted to the common electrode of the second display panel.

* * * * *